United States Patent [19]

Olsen et al.

[11] Patent Number: 4,686,474
[45] Date of Patent: Aug. 11, 1987

[54] SURVEY SYSTEM FOR COLLECTION AND REAL TIME PROCESSING OF GEOPHYSICAL DATA

[75] Inventors: Steven L. Olsen; William R. Petrick; John A. Stodt, all of Salt Lake City, Utah

[73] Assignee: Deseret Research, Inc., Salt Lake City, Utah

[21] Appl. No.: 597,251

[22] Filed: Apr. 5, 1984

[51] Int. Cl.[4] .......................... G01V 3/08; G01V 3/16; H04N 7/18
[52] U.S. Cl. ..................................... 324/331; 358/109
[58] Field of Search ....................... 324/330, 331, 326; 364/424, 443, 444, 449; 367/19; 358/109

[56] References Cited

U.S. PATENT DOCUMENTS

| | | | |
|---|---|---|---|
| 2,610,226 | 9/1952 | Klaase et al. | 324/331 |
| 2,891,108 | 6/1959 | Wiens | 178/6.7 |
| 2,931,857 | 4/1960 | Hammond, Jr. et al. | 178/6.5 |
| 3,005,044 | 10/1961 | Golay | 178/6.6 |
| 3,668,308 | 6/1972 | Burt et al. | 178/6.6 A |
| 3,709,607 | 1/1973 | McConnell et al. | 356/152 |
| 3,752,914 | 8/1973 | England et al. | 178/6.7 R |
| 3,864,513 | 2/1975 | Halajian et al. | 178/6.6 |
| 3,875,497 | 4/1975 | Madsen | 324/326 |
| 3,886,306 | 5/1975 | Fayard et al. | 178/6.8 |
| 4,217,607 | 8/1980 | Cohen | 358/109 |
| 4,234,241 | 11/1980 | Schmidt | 350/6.9 |
| 4,364,085 | 12/1982 | Dalke | 358/81 |
| 4,398,195 | 8/1983 | Dano | 343/6.5 R |
| 4,561,073 | 12/1985 | Brands Aeter et al. | 367/19 |

FOREIGN PATENT DOCUMENTS

| | | |
|---|---|---|
| 0123562 | 10/1984 | European Pat. Off. |
| 0959809 | 4/1950 | France . |
| 2055467 | 3/1981 | United Kingdom . |

OTHER PUBLICATIONS

Sequin, "Airborne Electromagnet Surveys . . .", L'onde Electrique, 1975, vol. 55, No. 1, pp. 38–47.
L. W. Morley, "The Geophysics Division of the Geological Survey of Canada," Bulletin of the Canadian Mining and Metallurgical Institute, pp. 358–364, (1963).
W. T. C. Sowerbutts and R. W. I. Mason, "A Microcomputer Based System for Small-Scale Geophysical Surveys," Geophysics, vol. 49, No. 2, (Feb. 1984), pp. 189–193.

Primary Examiner—Ernest F. Karlsen
Assistant Examiner—Walter E. Snow
Attorney, Agent, or Firm—Workman, Nydegger & Jensen

[57] ABSTRACT

A real time geophysical survey system and method. The system comprises a base station, one or more data acquisition vehicles, and one or more fixed reference stations. The base station is provided with a positioning system, suitable survey instrumentation, a computer, and radio communication equipment. The data acquistion vehicles are each provided with a positioning transponder, a positioning display, suitable survey instrumentation, and radio communication equipment. During a survey, by periodically polling each vehicle's positioning transponder, the base station positioning system tracks the position of each vehicle with respect to both the base station and the fixed reference stations. Data regarding each vehicle's position are then provided to the base station computer, and the base station transmits signals to the positioning display aboard each vehicle so as to guide the vehicle along a preselected survey pattern. As the survey progresses, data respresenting geophysical measurements taken by instrumentation carried by each vehicle are periodically transmitted to the base station computer. Such data are then correlated in real time with the position of the vehicle and with data collected at the base site, and then output for evaluation by the base station computer.

15 Claims, 3 Drawing Figures

SURVEY SYSTEM FOR COLLECTION AND REAL TIME PROCESSING OF GEOPHYSICAL DATA

BACKGROUND

1. The Field of the Invention

This invention relates to systems and methods for geophysical exploration and, more particularly to a novel system and method for conducting geophysical exploration using a real time data collection and processing survey system.

2. The Prior Art

Each year, billions of dollars are spent on various types of geophysical surveys. The majority of these surveys are presently conducted by oil companies in search of petroleum and related fuels. In addition, however, many geophysical surveys are conducted each year which relate to mineral, geothermal, and ground water exploration as well as oceanography, engineering, and geophysical research in general. As a result, during recent years, the geophysical exploration industry has grown steadily, and this growth pattern is expected to continue for several years to come.

One of the most widely used geophysical survey techniques is seismic surveying, which may be conducted either on land or at sea. Some recent studies indicate that expenses relating to seismic surveying have accounted for approximately 75% of all expenditures for geophysical exploration during recent years.

Despite the frequent use of seismic surveying, however, it has a number of significant drawbacks which reduce both its effectiveness and its desirability in geophysical exploration. First, seismic survey techniques are extremely costly. For example, a single line mile of surveying on land using seismic survey techniques may cost several thousand dollars. While marine seismic surveys may be somewhat less expensive, marine surveys may also cost over $1,000 per line mile. In addition to the high cost of seismic surveys, seismic surveys are known to be less effective in defining subsurface structure and lithology in many frontier areas in which geophysical exploration may be desirable. For example, the basalt- and volcanic-covered regions in the Pacific Northwest and the Intermountain Overthrust Belt are very difficult to effectively explore using seismic techniques.

In addition to the problems noted above, the drilling costs which are required in order to confirm a geophysical find have steadily increased. Moreover, geophysical exploration has surged, and competition in the geophysical exploration industry is increasing rapidly. As a result of these several factors, many attempts have been and are currently being made to develop other systems and methods for geophysical exploration. At the present time, one of the most promising of such methods appears to be that of airborne geophysical surveying, the use of which has risen steadily over the past several years. In particular, due to the significant refinements in aeromagnetic instruments, aeromagnetic surveys appear quite promising as an alternate geophysical exploration technique.

Aeromagnetic surveys are based upon the measurement of the earth's magnetic field over a particular region. It is generally known that the earth has a variable, magnetic field which is influenced by the presence of subsurface igneous and metamorphic rocks and sediments which contain magnetic particles, such as, for example, mixed oxides of iron and titanium and other magnetic ore bodies. The magnitude of the influence of such subsurface structures on the natural magnetic field in a given area is referred to as a magnetic anomaly, and such an anomaly can be measured quite precisely using an instrument called a magnetometer.

Advances in the design and sensitivity of magnetometers led to the first practical airborne use of the instrument in 1944. Since that time, further advances in instrumentation and data interpretation have led to broader application and sharply increasing use of aeromagnetic techniques for petroleum, mineral and geothermal exploration. Using such techniques, anomalous high or low values of magnetic field strength are of particular interest and are plotted as contours on appropriate maps. Properly processed and interpreted data can then be used to target the possible location and size of potential ore bodies, geothermal reservoirs, hydrocarbon traps or cultural artifacts. Thereafter, suspected finds are confirmed by the use of ground survey techniques and drilling.

Aeromagnetic surveys are presently conducted using a suitable aircraft which is equipped with a magnetometer, recording equipment, a sensitive altimeter, and a camera. The aircraft is manned by a flight crew which may consist of from one to three individuals, depending upon the particular requirements of the survey. For example, if the survey is being flown at a quite high altitude above ground level, the pilot may perform the aeromagnetic survey alone. However, when higher resolution aeromagnetics are desired, thus requiring the survey to be flown closer to the ground, the pilot is typically very busy flying and a separate navigator is usually required. In some cases, it may also be desirable to have a separate geophysical technician on board the aircraft during the survey.

Before an aeromagnetic survey is conducted, the survey is first planned by the contractor. After it is determined where the survey is to be conducted, the elevation at which the data is to be collected, and the spacing of the flight lines, the contractor maps out the survey by drawing the selected flight lines on aerial photographs of the survey area or by drawing such flight lines on topographical maps of the survey area.

Once the survey is thus planned, the flight crew is mobilized to the survey area and the survey is commenced. By following the flight lines which were previously drawn on the aerial photographs or topographical maps of the survey area, the navigator directs the pilot along the appropriate flight lines across the survey area. During the flight, the magnetometer is measuring the magnetic field, and such measurement is being recorded by the recording equipment. At the same time, the camera takes photographs of the ground over which the plane is flying.

After the survey has been conducted and the data recorded, the flight crew returns to its base. The data can then begin to be analyzed and interpreted. In interpreting the data, a flight line positioner first views the film frame by frame and matches the photos taken by the camera on the aircraft with a large aerial photograph of the survey area. In this way, the flight line positioner determines the plane's actual position during each flight segment of the survey. Then, once the actual flight lines have been determined by the flight line positioner, the data which was recorded during the flight are corrected for diurnal changes in the earth's magnetic field and are plotted at the appropriate points along the flight lines. Finally, the data are properly contoured and are thereafter ready to be analyzed.

It will be readily appreciated that the prior art aerial survey technique described above may give rise to a number of problems and difficulties. First, it may be quite difficult to accurately position the aircraft during the survey using the topographical maps or aerial photographs on which the flight lines have been drawn. This is particularly true in areas of low relief over which the aircraft may need to travel. Positioning may also be a problem over heavily forested, totally denuded, snow-covered, or water-filled areas. Similarly, it may be extremely difficult for the flight line positioner to later match the photographs taken by the aircraft's camera over such areas with the aerial photograph of the survey area.

In addition, since aeromagnetic surveys are typically flown quite close to the ground, the camera image of the survey area may be quite blurred, with a very small angle of acceptance. Consequently, only a very small visual sample of the ground may be obtained on the film, which in turn also makes flight line recovery very difficult.

An additional difficulty inherent in prior art aeromagnetic techniques arises from the fact that the equipment which the aircraft must carry, together with the required number of crew members, may be quite heavy. Accordingly, a large plane or helicopter is typically required in order to carry all of the equipment and crew members. Unfortunately, however, large planes have a relatively high stall speed. For example, a large fixed wing plane may have a stall speed of over 100 miles per hour. Consequently, when using such a plane, the survey must be flown at over 100 miles per hour in order to avoid stalling. It will be appreciated, however, that flying an aircraft relatively close to the ground at such a speed may be quite dangerous; and it may, therefore, be difficult to find pilots willing to fly the planes in this manner on a regular basis. If, on the other hand, a helicopter is chosen for purposes of conducting a survey, the cost of the survey increases substantially. It is not uncommon at the present time, for example, for helicopters to cost more than $1000 per hour to rent.

In addition to the above, one very significant drawback associated with prior art aeromagnetic survey techniques is that a substantial amount of time is required before a finished survey product is available for use. First, it may take two to three weeks just to complete the task of flight line recovery for the survey. Then, the data must be corrected, plotted, and contoured. Thus, even assuming that all of the instruments on the aircraft were functioning properly during the survey, it may be a month or more before the data acquired during the survey are actually ready for use and analysis. Even more troublesome is the fact that malfunctioning equipment and/or faulty data may not be discovered until weeks after the survey has been flown, and this may require that the survey be reflown at a later date.

Accordingly, it would be an improvement in the art to provide a system and method for conducting geophysical surveys in which the survey pattern may be accurately controlled while collecting data. It would also be an improvement in the art to provide a geophysical survey system in which the data collection equipment is lightweight and the crew requirements are minimal, thereby permitting the use of a small aircraft for aerial survey applications. In addition, it would be an improvement in the art to provide a system and method for conducting geophysical surveys in which the data may be processed and analyzed in real time while the survey is underway. Further, it would be an improvement in the art to provide a system and method for conducting geophysical surveys in which both the integrity of the data and the accuracy of the instruments may be verified before the data acquisition vehicle (DAV) leaves the survey area. Such a system and method are disclosed and claimed herein.

BRIEF SUMMARY AND OBJECTS OF THE INVENTION

The present invention is directed to a system and method for conducting geophysical exploration using a real time data collection and processing survey system. The system comprises a base station, one or more data acquisition vehicles (DAVs) which, in one preferred embodiment, may comprise an ultralight aircraft having a low stall speed, and one or more fixed reference stations. The base station is provided with a positioning system, suitable survey instrumentation, a computer, and radio communication equipment. The data acquisition vehicles are each provided with a positioning transponder, a positioning display, suitable survey data collection instrumentation, and radio communication equipment.

During a survey, by periodically polling each vehicle's positioning transponder and each fixed reference station, the base station positioning system tracks the position of each vehicle using a preselected, computer-controlled survey pattern. The base station also transmits signals to the positioning display aboard each vehicle so as to automatically guide the pilot of each vehicle with a very high degree of precision along the preselected survey pattern over a specified geographic area. As the survey progresses, data representing measurements made by each vehicle's data collection instrumentation is periodically digitized and transmitted to the base station computer. The data is checked, interpreted, and correlated with the position of the vehicle by the base station computer in real time. Thus, as the data is collected, the data is analyzed and is compiled in a useable format for on-site evaluation.

It is, therefore, a primary object of the present invention to provide a real time geophysical survey system for data collection and processing, and which is capable of yielding on-site high quality data and data processing at a relatively low cost.

It is also an object of the present invention to provide a survey system in which the survey instrumentation is lightweight and may thus be carried by a light airborne unit such as an ultralight aircraft.

It is a further object of the present invention to provide a data collection and data processing system which permits an on-site check of the integrity of the collected data and of the accuracy of the data collection instruments.

It is a still further object of the present invention to provide a geophysical data collection and data processing system in which the data is evaluated in real time as the survey progresses.

These and other objects and features of the present invention will become more fully apparent from the following description and appended claims, taken in conjunction with the accompanying drawings.

DETAILED DESCRIPTION OF THE PREFERRED EMBODIMENT

It will be readily appreciated that the system and method of the present invention as generally described and illustrated in the figures herein could be arranged and designed in a wide variety of different configurations. Thus, the following more detailed description of the presently preferred embodiment of the invention as illustrated in FIGS. 1 through 3 is not intended to limit the scope of the invention but is merely representative of one embodiment of the invention.

Figure 1:
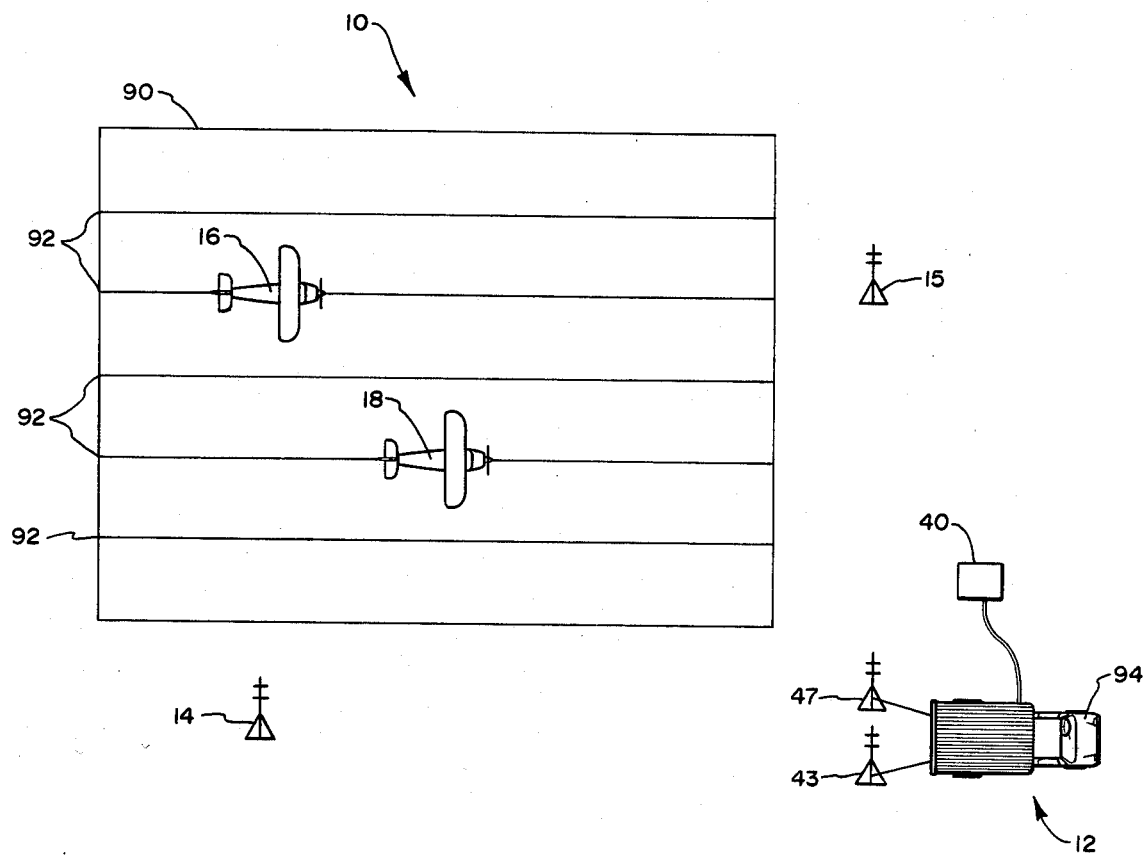
FIG. 1 is a top plan view schematically illustrating one presently preferred embodiment of the real time data collection and processing system of the present invention.

The field set up for the real time aerial survey system is generally designated at 10 in FIG. 1. As shown in the presently preferred embodiment of the invention, the system 10 comprises a base station 12, two reference stations 14 and 15, and data acquisition vehicles which, for an aerial survey system, comprise two airborne units 16 and 18. Advantageously, the airborne units 16 and 18 may comprise, for example, ultralight aircraft or other suitable aircraft which has a low stall speed and which can be flown safely at relatively low altitudes and speeds.

In cooperation with fixed reference stations 14 and 15, base station 12 periodically checks the position of airborne units 16 and 18 and guides airborne units 16 and 18 in accordance with the selected survey pattern represented by flight lines 92 over a survey area 90. During the survey, data measured by instruments on board the airborne units 16 and 18 are digitized and periodically transmitted back to base station 12, where the data are then correlated in real time with respect to the position of the airborne unit 16 or 18 at the time the data was collected.

Figure 2:
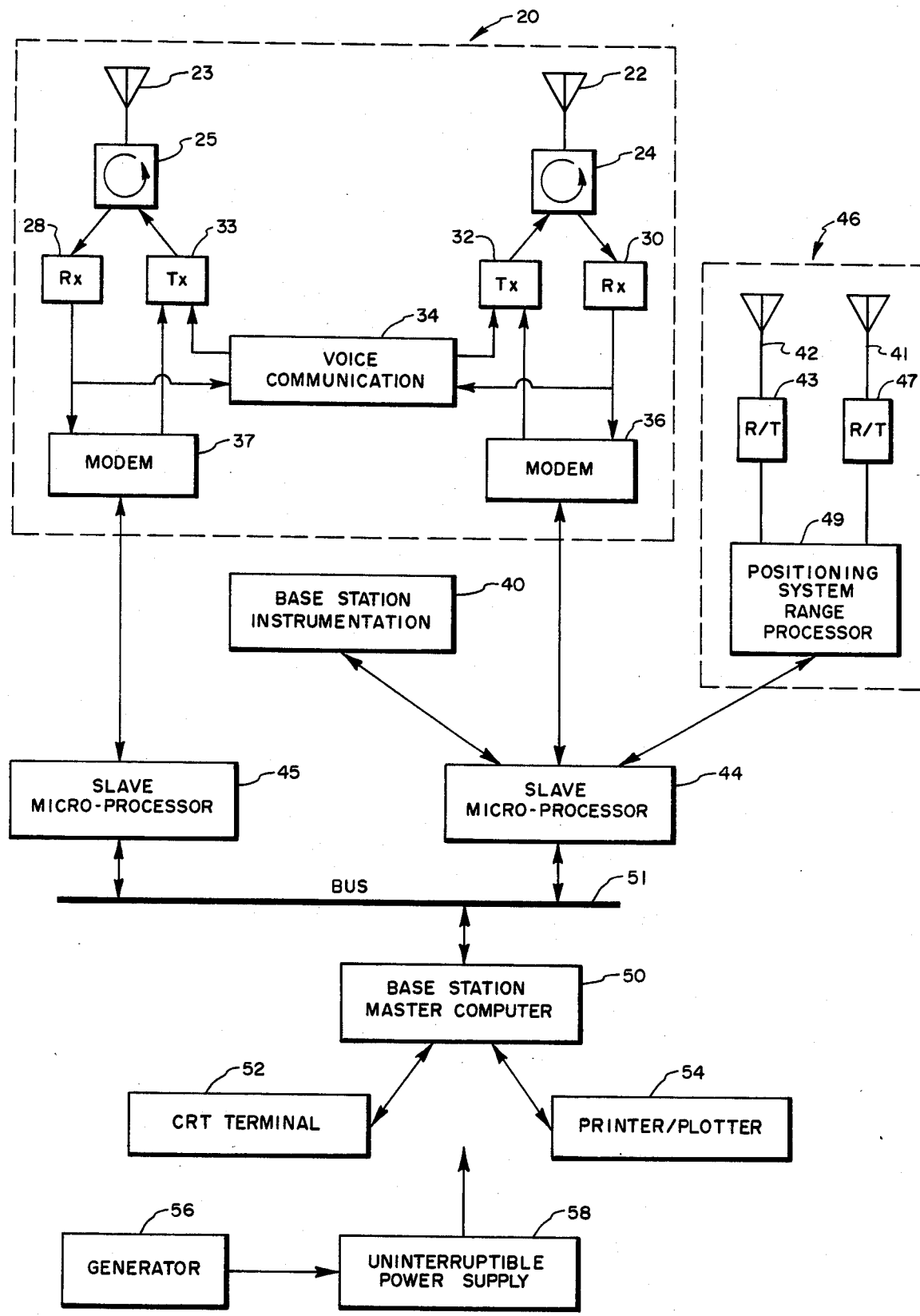
FIG. 2 is a functional block diagram illustrating one presently preferred embodiment of the base station components of the system of the present invention.
Figure 3:
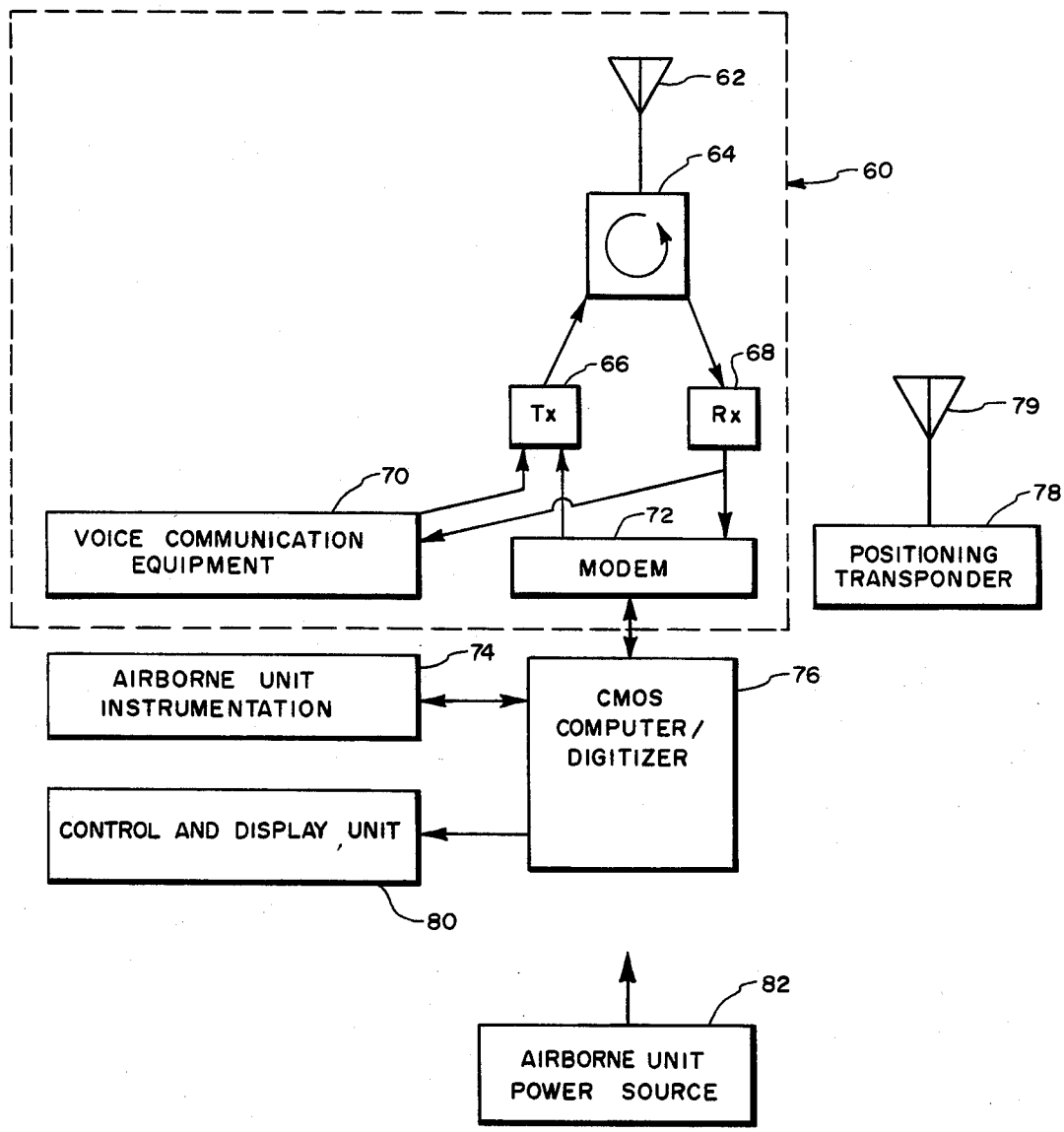
FIG. 3 is a functional block diagram illustrating one presently preferred embodiment of the data collection and communication equipment carried by a data acquisition vehicle of the system of the present invention.

The various hardware components which comprise base station 12 are illustrated in FIG. 2. As shown, base station 12 is provided with communication equipment as generally indicated at 20 to permit telemetry and voice communication between base station 12 and airborne units 16 and 18. Communication equipment 20 may, for example, comprise an antenna 22 which is connected to a duplexer 24, duplexer 24 permitting antenna 22 to be used for both reception and transmission. Communication equipment 20 may also include a conventional transmitter 32 and receiver 30 connected to standard voice communication equipment 34, and a modem 36 which is connected as shown. Thus, communication equipment 20 allows base station 12 to receive either digital or voice signals transmitted from one of airborne units 16 or 18 and to transmit either digital or voice signals to airborne units 16 and 18.

Since in the preferred embodiment as illustrated in FIG. 1 two airborne units are used, the communication equipment 20 includes a second set of equipment configured like that described above. Thus, antenna 23, duplexer 25, receiver 28, transmitter 33 and modem 37 operate in the same manner already described.

As further illustrated in FIG. 2, modems 36 and 37 of communication equipment 20 are each connected to a slave processor 44 and 45, respectively. As set forth more fully below, a primary function of slave processors 44 and 45 is to handle communication protocol for base station 12. Thus, slave processors 44 and 45 process and transmit data to other components of base station 12, and they also help control the transmission and reception of data to airborne units 16 and 18.

Base station 12 also comprises base station instrumentation 40. Instrumentation 40 may be any instrumentation which is suitable for a particular, desired application of the geophysical survey system of the present invention. For example, when geophysical survey system 10 is to be used for aeromagnetic surveying, base station instrumentation 40 may comprise a suitable barometer, and a magnetometer. In other types of applications, the instrumentation might comprise, for example, a gas chromatograph, a mass spectrometer, a gamma ray spectrometer, a magnetic gradiometer or other types of instrumentation adapted for gathering specific types of data.

Base station 12 is also provided with a positioning system generally designated at 46. Positioning system 46 has separate antennae 41-42 which receive positioning signals on different frequencies by way of transmitter/receivers 43 and 47 from each of the airborne units 16 or 18 and from the fixed reference stations 14 and 15. As described more fully below, positioning system 46 processes the information received between the airborne unit and the fixed reference stations and base station, and then sends this information through slave processor 44 to the base station's master computer 50. Computer 50 periodically checks and verifies or corrects the position of airborne units 16 and 18 in accordance with the selected survey pattern over survey area 90 (see FIG. 1).

Slave processors 44 and 45 are connected by data bus 51 to the base station master computer 50. As hereinafter more fully described, slave processors 44 and 45 transmit data to computer 50 along bus 51, and computer 50 then processes the data in real time. Additionally, computer 50 is provided with suitable peripheral devices such as, for example, a CRT terminal 52 and printer/plotter 54. Thus, an operator at base station 12 may use computer 50 to control data acquisition and processing during a survey and to display the processed data in real time so that on-site analysis can be achieved even while the survey is underway.

As also shown in FIG. 2, all of the components of base station 12 are powered by a suitable generator 56 which drives an uninterruptable power supply 58. This ensures that the various components of base station 12 are provided with a stable source of power when base station is in the field.

As depicted in FIG. 1, base station 12 may advantageously be housed in a van 94 or some other suitable vehicle. In such a case, base station instrumentation 40 and antenna 41-42 with transmitter/receivers 43 and 47 could optionally be housed in such a manner so as to be capable of being positioned independently of van 94, as shown. Similarly, generator 56 and uninterruptable power supply 58 could optionally be connected to a separate trailer so as to both minimize noise and maximize available space within van 94.

The data collection and communication equipment of a typical data acquisition vehicle is illustrated in FIG. 3. As shown, airborne units 16 and 18 may each include suitable communication equipment as generally indicated at 60. Similar to communication equipment 20 of base station 12, communication equipment 60 may, for example, comprise an antenna 62, a duplexer 64, a transmitter 66, and a receiver 68, duplexer 64 allowing antenna 62 to be used for both transmission and reception. In addition, communication equipment 60 may include standard voice communication equipment 70 and a modem 72. Thus, digital or voice signals may be transmitted and received by communication equipment 60 on airborne units 16 and 18.

Airborne units 16 and 18 further include airborne unit instrumentation 74. Instrumentation 74 may comprise any instrumentation which is suitable to the particular type of data being collected. For example, for aeromagnetic surveys, instrumentation 74 may comprise a magnetometer and a barometric altimeter. Other types of instrumentation would be used, as noted above, when detecting different parameters used to define other types of geophysical data. Airborne unit instrumentation 74 is connected to a CMOS computer/digitizer 76. CMOS computer/digitizer 76 controls the collection of analog data from instrumentation 74, digitizes the collected data, and then transmits the digitized data through modem 72 to base station 12.

As further illustrated in FIG. 3, each airborne unit 16 and 18 is also provided with a positioning transponder 78 and an associated antenna 79. In response to polling signals periodically transmitted by positioning system 46 at an antenna 41 or 42 of base station 12 (see FIG. 2), positioning transponder 78 transmits a signal to positioning system 46. In addition to being picked up by one of the antennae 41 or 42, the signal is also picked up and relayed to positioning system 46 by each reference station 14-15. The signals from the airborne unit and reference stations are then processed as described above by range processor 49 so as to determine the distances between the airborne unit and each fixed reference station and between the airborne unit and base station. (Distances between each fixed reference station and the base station are known and are constant.) The information from range processor 49 is then sent by slave processor 44 to master computer 50 along with barometric altimeter data collected at the airborne unit instrumentation 74 and the base station instrumentation 40. Computer 50 then uses conventional triangulation techniques to determine the X, Y and Z coordinates of the airborne unit so as to determine its position in relation to area 90.

After determining such coordinates, base station 12 may then transmit a positioning signal from equipment 20 to airborne units 16 or 18. The signal is processed by the CMOS computer/digitizer 76 and output at the positioning display 80. Positioning display 80 may be virtually any display means which is suitable to indicate to the pilot of an airborne unit whether or not such airborne unit is correctly following the selected flight line. For example, positioning display 80 may comprise four lighted arrows indicating that the position of the airborne unit should be adjusted either to the left, to the right, upward, or downward.

Finally, FIG. 3 illustrates that the various components of airborne units 16 and 18 may be powered by an airborne unit power source 82. Power source 82 may, for example, comprise a suitable battery or a suitable generator driven by the aircraft motor.

As an illustration of the manner in which real time data collection and processing may be implemented using the system and method described herein, the following example is provided. The example is to be considered merely as illustrative of one particular design for the system.

EXAMPLE 1

In one example of the geophysical data collection and processing system of the present invention, the system is used to collect high resolution aeromagnetic data and to process it in real time. In this application the airborne unit instrumentation 74 will be mounted, for example, in an ultralight aircraft such as a B1-RD Ultralight manufactured by the Robertson Aircraft Corporation. Because of the low stall speed of the ultralight aircraft, aerial surveys can be conducted at relatively low altitudes and speeds, thus greatly enhancing resolution without endangering the pilot. Two airborne units may be used simultaneously to speed the data collection process.

The airborne unit instrumentation 74 (see FIG. 3) carried by the aircraft consists of a Setra Systems model 270 barometric pressure transducer calibrated for the range of 700 to 1100 mbar, a modified GEM model GSM-11 magnetometer with a custom interface to the CMOS computer/digitizer 76 which is designed to permit measurements of the magnetic field to 0.1 gamma precision at least once every 0.5 seconds, and a Sperry model RT-100A altimeter with an AT-100 antenna. The CMOS computer/digitizer 76 (see FIG. 3) which is located on board the ultralight aircraft consists of a CIM-802 microprocessor with a 2 megahertz clock, and includes the following equipment: a CIM-100 memory expander; a CIM-201 serial input/output port; a CIM-411 analog-to-digital (A/D) converter; a CIM-421 digital-to-analog (D/A) output; a CIM-610 voltage regulator; and a CIM-602 card cage, all of which are components manufactured by National Semiconductor Corporation.

For purposes of this example, other base station components as illustrated in FIG. 2 are as follows: generator 56 may consist of an Onan model 6.5 NH 6.5 KVA gasoline motor generator, and the uninterrupted power supply 58 may consist of a Triad-Utrad model KU-811 750 VA uninterruptable power supply capable of continuous operation with a backup time of 20 minutes. The base station master computer 50 consists of a Digital Equipment Corporation Micro-PDP-11 rack mount computer with the following options: an LSI 11-23 processor, an MSV11-PK 256 kilobyte random access memory; two RX50 and one RD51 disk systems; two MSV11-PL 512 kilobyte random access memories; a DVL11-ED serial communications port; and a DVL11-JA quadruple serial communications port. The CRT terminal 52 may consist of a Digital Equipment Corporation model VT240 text and graphics terminal, and the printer/plotter may be a Digital Equipment Corporation model LA-100 dot matrix printer with dot addressable graphics capability.

The slave processors 44 and 45 may be Digital Equipment Corporation model KXT11-CA slave processors and the bus 51 may consist of a Digital Equipment Corporation Q-22 bus, which is typically supplied as standard equipment with the above-described base station master computer 50.

The positioning system 46 of the base station as well as the positioning transponder 78 and the two fixed reference stations 14 and 15 (see FIG. 1) would be provided as part of a total system, as for example the Motorola Corporation Mini-Ranger Falcon 492 Tracking System. This system includes up to three fixed reference stations and may be used with up to eight separate positioning transponders used on data acquisition vehicles. For purposes of this example, two fixed reference stations and two positioning transponders are used.

The base station instrumentation 40 includes a Setra Systems Model 270 barometric pressure transducer calibrated for the range of 700 to 1100 mbar and a magnetometer capable of measuring the field at least every 0.5 seconds to 0.1 gamma precision. As noted above, the GEM Model GSM-11 meets this requirement.

The communications equipment represented at 20, and for each aircraft at 60 FIGS. 2 and 3, respectively, may comprise a Motorola Corporation full duplex radio telemetry system consisting of two model SP27/SQ1017 radios, one of which is used in the aircraft and the other being used at the base station; a Motorola omni-directional antenna with transmission line, model TAE6052 used on each aircraft; a Motorola Yagi 7.5 dB antenna, model TDE6630 used at the base station; and two Racal-Vadic modems, model VA 1251G/K, one placed in the aircraft and the other at the base station.

As mentioned above, the real time geophysical data collection and processing system of the present invention may be readily employed to collect and process many types of geophysical data, such as in the case of high resolution aeromagnetic surveys. Use of the system to perform data collection and processing of aeromagnetic data would proceed as follows.

First, the aerial survey is planned. That is, a determination is made as to the geographical area over which the aerial survey is to be conducted, the altitude at which the data is to collected, and the desired spacing of the flight lines to provide the needed resolution of the data. Thereafter, data representing the desired flight pattern are stored in master computer 50 of base station 12 for use in guiding airborne units 16 and 18 during the survey.

As the airborne units 16 and 18 follow the flight pattern over survey area 90, the positioning system 46 of base station 12 periodically poles the transponder 78 carried on board each airborne unit. Each airborne unit also collects analog data using instrumentation 74 (in this case a barometric altimeter) which is used to determine the altitude of the aircraft. The analog data collected by instrumentation 74 are digitized by the computer/digitizer 76 on board the aircraft, and the digitized data are then transmitted to the base station by modem 72 and transmitter 66.

At the base station, the altitude data transmitted from the aircraft are received at one of the antennae 22 or 23 and receivers 30 or 28 and sent by a corresponding modem 36 or 37 and slave processor 44 or 45 to the computer 50. A barometric altimeter at base station instrumentation 40 also collects data that are transmitted from slave processor 44 to the master computer 50.

Master computer 50 then processes the above-mentioned positioning data, which includes the altitude data from airborne and base station instrumentation 74 and 40 and the range signals sent by the transponder 78 and fixed reference stations 14 and 15, so as to determine the X, Y and Z coordinates of the aircraft in relation to the geographic survey area 90. These coordinates are then compared with the selected flight lines previously determined and programmed in the base station master computer 50, so that the computer 50 may determine what adjustment, if any, is needed to bring the airborne units 16 or 18 back into alignment with the desired flight pattern. A signal is then transmitted through slave processor 44, modem 36 and transmitter 32 back to the aircraft to indicate the needed adjustment.

The adjustment information sent to the aircraft is received, by the computer/digitizer 76 and then displayed at the positioning display 80 to indicate whether the aircraft needs to move to the left, to the right, up or down. In this manner, the position of the aircraft is accurately tracked during the course of the survey and can be adjusted in real time to make sure that the desired flight pattern is accurately traversed by the aircraft.

Since the base station is capable of individually tracking and guiding multiple airborne units, several airborne units may be used during a single survey with each unit flying a portion of the total survey flight lines. In this manner the data collection can be accomplished more quickly.

When the system is used to conduct an aeromagnetic survey as in the case of Example 1 mentioned above, the airborne unit instrumentation 74 carried on board the aircraft also transmits analog magnetic field data to the computer/digitizer 76. This data is digitizer and transmitted through modems 72 and 36 to slave processor 44. Slave processor 44 then transfers the data to the master computer 50 which processes and stores the data and then outputs it to CRT terminal 52 and/or the printer/plotter 54.

The geophysical data that is collected by the airborne unit instrumentation 74 is synchronized with the positioning data that is sent back to the base station 12 so that the geophysical data can be correlated in time to the survey coordinates which represent the position of the aircraft at the time the data was collected. Synchronization is provided by a clock at the master computer 50, which is used to trigger local clocks used in connection with gathering the geophysical and positioning data at synchronized time intervals.

For example, time synchronization between the master clock at base station computer 50 and the local clock used at the computer/digitizer 76 on board each airborne unit may be carried out each time an airborne unit complete a flight line and turns around to begin the next flight line. The process of synchronizing the local time clock used in each computer/digitizer 76 with the master clock in the base station master computer 50 may be accomplished as follows.

A time synchronization data packet is transmitted from the base station at a rising edge of the clock in the master computer 50. Computer/digitizer 76 on board the aircraft identifies the data packet and notes the current local time. The time to the rising edge of the next clock count of master computer 50 can be calculated, given the baud rate that was used to transmit the synchronization data packet. After the calculated time is passed, the local time clock on board the aircraft is set to one greater than the time value in the data packet that was transmitted from the base station, and a prescale divide chain is set to zero. The computer/digitizer 76 on board the aircraft then sends a similar data packet back to the base station and the time value in the data packet transmitted from the aircraft is compared to the master time clock. If the difference between the local and the master time clocks is within a selected tolerance, synchronization is assured; otherwise the time synchronization process is repeated.

Since the geophysical data and the position data collected by each airborne unit is synchronized, the base station computer 50 is able to correlate the position of the aircraft at the time the geophysical data was collected, with the coordinates of geographic area 90. In this manner the master computer 50 can determine the position of the aircraft in relation to area 90 at the time the data was collected. The geophysical data is processed in real time by the base station computer 50 and displayed at the CRT terminal 52 and/or the printer 54 so that an operator at the base station can analyze the data as it is collected. Significantly, the operator at the base station can make dynamic changes in the survey flight pattern or he can have segments of the flight pattern reflown if he feels the data is inadequate to permit accurate interpretation. This significantly enhances the accuracy and reliability of the aerial survey making the entire process much more efficient and reliable.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A real time aerial survey system for conducting aerial surveys over a survey area, the system comprising:
    an aircraft;
    means, carried by said aircraft, for detecting one or more parameters which define geophysical data;
    a base means for automatically tracking and computing the position of the aircraft according to horizontal and vertical flight positioning data determined relative to said survey area;
    means, responsive to said tracking means and carried on said aircraft, for automatically guiding said aircraft along preselected flight lines over said survey area according to said automatically computed horizontal and vertical flight positioning data;
    means, carried by said aircraft and connected to said detecting means, for transmitting radio signals representing said parameters defining said geophysical data and representing said horizontal and vertical positioning data;
    means located adjacent said survey area, for receiving said radio signals representing said parameters and representing said horizontal and vertical positioning data; and
    means, responsive to both said tracking means and to said radio signal receiving means, for correlating in realtime the geophysical data with the position of the aircraft in relation to said survey area at each instant of time when said parameters were detected.

2. A real time aerial survey system as defined in claim 1 wherein said detecting means comprises:
    instrumentation for generating analog signals representing the parameters defining said geophysical data;
    means for digitizing said analog signals; and
    means for transmitting the digitized signals to said means for correlating said geophysical data with the position of said aircraft.

3. A real time aerial survey system as defined in claim 2 wherein said means for tracking the position of said aircraft in relation to said survey area comprises:
    a base station;
    at least one reference station;
    a positioning transponder connected to the aircraft;
    means, responsive to signals transmitted by said transponder, for generating digital signals representing the distance of the aircraft with respect to the base station and with respect to the reference station;
    a first barometric altimeter connected to the aircraft;
    means for digitizing data collected by said first barometric altimeter;
    a second barometric altimeter positioned adjacent the base station; and
    means for processing data collected from said first and second barometric altimeters and from said positioning transponder so as to determine the position of said aircraft in relation to said survey area.

4. A real time aerial survey system as defined in claim 3 wherein the aircraft comprises an ultralight aircraft.

5. A survey system for collecting geophysical data in a specified geographic area and for processing said geophysical data in real time, said survey system comprising:
    (a) a data acquisition vehicle for traversing said specified geographical area, said data acquisition vehicle comprising:
        (i) means for detecting one or more parameters which define said geophysical data;
        (ii) means for generating positioning signals from which the horizontal and vertical position of said data acquisition vehicle relative to said geographic area can be automatically determined;
        (iii) navigation means for receiving automatically computed realtime data sent by a base station indicating the realtime horizontal and vertical position of said data acquisition vehicle, such that the position of said vehicle can be corrected according to said automatically computed realtime data to maintain said data acquisition vehicle in alignment with a preselected survey pattern while traversing said specified geographical area; and
        (iv) means for transmitting said positioning signals and electronic signals representing said geophysical data in synchronization with one another;
    (b) a reference station for receiving a first portion of said position signals from said data acquisition vehicle and relaying said first portion of said positioning signals; and
    (c) a base station comprising:
        (i) telemetry means for receiving from said data acquisition vehicle said electronic signals and a second portion of said positioning signals and for receiving from said reference station said first portion of said positioning signals;
        (ii) data processing means connected to said telemetry means for electronically processing signals received thereat to determine automatically in realtime said position of said data acquisition vehicle relative to said geographic area and to correlate and display automatically in real time said geophysical data and said position of said data acquisition vehicle in relation to where said geophysical data was detected; and (iii) base station transmission means coupled to said data processing means for automatically communicating in realtime to said navigation means of said data acquisition vehicle data indicating said position thereof relative said geographic area.

6. A system as defined in claim 5 wherein said vehicle is an ultralight aircraft.

7. A system as defined in claim 6 wherein said means for generating positioning signals comprises:
a positioning transponder carried by said aircraft, and means for determining the altitude of said aircraft.

8. A system as defined in claim 5 wherein said means for transmitting said position signals and said electronic signals representing said geophysical data comprises:
means for digitizing at least a portion of said data, a modem connected to said means for digitizing said data, an electronic transmitter connected to said modem and an antenna connected to said transmitter.

9. A system as defined in claim 8 wherein said navigation means carried by said vehicle comprises a duplexer interconnected between said transmitter and said antenna for permitting said antenna to be used for both transmitting and receiving electronic signals, and a receiver interconnected between said duplexer and said modem.

10. A system as defined in claim 5 wherein said means for detecting said one or more parameter which defines said geophysical data comprises a magnetometer.

11. A system as defined in claim 5 wherein said vehicle comprises an aircraft; said means for generating positioning signals comprises a positioning transponder, means for determining the altitude of said aircraft, and means for digitizing data representing said altitude of said aircraft; and said positioning signals comprise signals from said positioning transponder and signals representing said altitude of said aircraft.

12. A system as defined in claim 11 wherein said telemetry means at said base station comprises:
a first antenna connected to an electronic receiver, and a modem connected to said electronic receiver, said first antenna and said electronic receiver being adapted to receive digitized signals transmitted from said aircraft; and
a second antenna connected to a positioning system, said second antenna and positioning system being adapted to receive said portion of said positioning signals sent by said positioning transponder and relayed by said reference station.

13. A system as defined in claim 5 wherein said data processing means comprises:
a data transfer bus;
a slave processor connected to said data transfer bus controlling the transfer of data to said data transfer bus;
a master computer connected to said data transfer bus, said master computer being adapted to process said geographic data and said positioning data in real time so as to correlate said geographic data to each position on said specified geographic area where said data was detected; and
means for displaying said geophysical data processed by said master computer.

14. A system as defined in claim 13 wherein said base station further comprises means, connected to said slave processor, for determining the barometric pressure at said base station.

15. In a survey system having a data acquisition vehicle, a reference station and a base station, a method of collecting geophysical data over a specified geographic area and of processing said data in real time, said method comprising the steps of:
detecting one or more parameters which define said geophysical data as said vehicle traverses a selected survey pattern over said specified geographic area;
automatically generating at said vehicle horizontal and vertical positioning data from which the position of said vehicle can be determined in relation to said geographic area;
automatically guiding said vehicle along a preselected survey pattern over said geographic area according to electronic signals received from said base station representing the real time position of said vehicle in relation to said survey pattern;
synchronizing the detection of said parameters with the generation of said positioning data;
transmitting electronic signals representing said geophysical data and representing said horizontal and vertical positioning data from said data acquisition vehicle to said base station;
transmitting electronic signals representing at least some of said horizontal and vertical positioning data from said data acquisition vehicle to said reference station;
receiving at said reference station and relaying from said reference station to said base station said signals representing at least some of said horizontal and vertical positioning data;
receiving at said base station said signals transmitted from said vehicle and said signals relayed from said reference station; and
electronically processing said signals received at said base station so as to determine automatically in real time the position of said vehicle in relation to said geographic area and to said selected survey pattern and to correlate and display automatically in real time said geophysical data at each position of said vehicle corresponding to the position on said geographic area where such geophysical data was detected by said vehicle.

* * * * *

UNITED STATES PATENT AND TRADEMARK OFFICE
CERTIFICATE OF CORRECTION

PATENT NO. : 4,686,474

DATED : August 11, 1987

INVENTOR(S) : Steven L. Olsen et al.

It is certified that error appears in the above-identified patent and that said Letters Patent is hereby corrected as shown below:

```
     Column 6, line 32, "received between" should be --received
using a range processor 49 to determine the distances between--
     Column 11, line 60, "realtime" should be --real time--
     Column 12, line 40, "realtime" should be --real time--
     Column 12, line 41, "realtime" should be --real time--
     Column 12, line 65, "realtime" should be --real time--
     Column 13, line 5, "realtime" should be --real time--
```

Signed and Sealed this

Twenty-sixth Day of January, 1988

Attest:

DONALD J. QUIGG

Attesting Officer

Commissioner of Patents and Trademarks